United States Patent [19]
Roza

[11] 3,993,952
[45] Nov. 23, 1976

[54] TRANSMISSION SYSTEM FOR PULSE SIGNALS OF FIXED CLOCK FREQUENCY

[75] Inventor: Engel Roza, Eindhoven, Netherlands

[73] Assignee: U.S. Philips Corporation, New York, N.Y.

[22] Filed: June 11, 1975

[21] Appl. No.: 586,061

[30] Foreign Application Priority Data
June 20, 1974 Netherlands............... 7408243

[52] U.S. Cl. ............................. 325/13; 325/2; 325/42; 178/69.5 R
[51] Int. Cl.² ........................................ H04B 3/10
[58] Field of Search ........... 178/69.5 R, 69 G, 70 T; 325/13, 2, 42, 322; 328/164; 333/15, 18

[56] References Cited
UNITED STATES PATENTS
3,456,191   7/1969   Rodenburg ....................... 325/2

Primary Examiner—Harold I. Pitts
Attorney, Agent, or Firm—Frank R. Trifari; Simon L. Cohen

[57] ABSTRACT

A transmission system for pulse signals of fixed clock frequency having repeaters located in the transmission path, each of which is provided with an adjustable equalizing amplifier, a pulse regenerator and a clock extraction circuit. In addition to the pulse signals a pilot signal synchronized with the clock frequency is transmitted which is synchronously mixed with a local pilot signal derived from the clock extraction circuit. From the mixing product an adjusting signal for automatic equalization is derived which is reliable under all conditions. The resulting simplicity of structure and implementation of the equalizing amplifier renders the transmission system particularly suited for pulse signals at a very high clock frequency.

5 Claims, 8 Drawing Figures

TRANSMISSION SYSTEM FOR PULSE SIGNALS OF FIXED CLOCK FREQUENCY

BACKGROUND OF THE INVENTION

The invention relates to a transmission system for pulse signals of fixed clock frequency comprising a transmitter, a receiver and a plurality of repeaters located in a transmission path. The receiver and the repeaters are each provided with an input circuit and an equalizing amplifier which is connected thereto and comprises a fixed section for equalizing the nominal transfer characteristic of the preceding transmission path and an adjustable section with associated adjusting circuit for automatically equalizing deviations from the said nominal transfer characteristic. The equalizing amplifier is connected to a pulse regenerator and to a clock extraction circuit for obtaining the clock frequency for controlling the pulse regenerator, an output circuit being connected to the pulse regenerator. Such transmission systems are generally known and are used for the transmission of pulse code modulation signals, synchronous telegraphy and data signals and the like.

In such a transmission system the transfer characteristic of the transmission path, which in many cases is a cable, is a function of the distance between two successive repeaters and of the ambient temperature. To obtain maximum uniformity and simplicity of the design of the repeaters, the equalization required for pulse regeneration is effected in the equalizing amplifier in a fixed section which equalizes the transfer characteristic of a transmission path of nominal length at a nominal temperature and in an adjustable section for automatically equalizing the variations with respect to this nominal transfer characteristic which variations are caused by deviations from the nominal length and from the nominal temperature which are inevitable in practice.

In many applications the adjusting signal for automatic equalization is obtained by means of an adjusting circuit including a peak detector which is connected to the output of the equalizing amplifier. The output signal of the peak detector is used to adjust the equalizing amplifier so that the pulse signals is its output have a constant peak value. However, it has been found that obtaining a reliable adjusting signal according to this method results in that the requirements to be satisfied by the amplifier proper, which particularly in transmission systems for pulse signals of clock frequencies higher than 30 MHz are exacting in any case, become even more stringent and nevertheless correct adjustment of the equalization is not obtained under all conditions.

It is an object of the present invention to provide a transmission system of the type set forth in the preamble in which the amplifier proper does not have to satisfy additional requirements to obtain a reliable adjusting signal for equalization and yet under all conditions correct adjustment of this equalization is ensured, which transmission system is of simple structure and highly suited for pulse signals of very high clock frequencies.

SUMMARY OF THE INVENTION

The transmission system according to the invention is characterized in that the transmitter includes a combining circuit in which the pulse signals are combined with a pilot signal synchronized with the clock frequency. The adjusting circuit in the receiver and in each repeater is provided with a selection filter coupled to the input circuit and serving to select the received pilot signal. In a mixer stage the received pilot signal is mixed with a local pilot signal derived from the clock extraction circuit. The mixing product selected by means of a lowpass filter is applied via an amplifier as an adjusting signal to the adjustable section of the equalizing amplifier. The output circuit of each repeater includes a combining circuit in which the pulse signals regenerated in the pulse regenerator are combined with the local pilot signal.

BRIEF DESCRIPTION OF THE DRAWINGS

Embodiments of the invention will now be described, by way of example, with reference to the accompanying diagrammatic drawings, in which.

DESCRIPTION OF THE PREFERRED EMBODIMENTS

Figure 1:
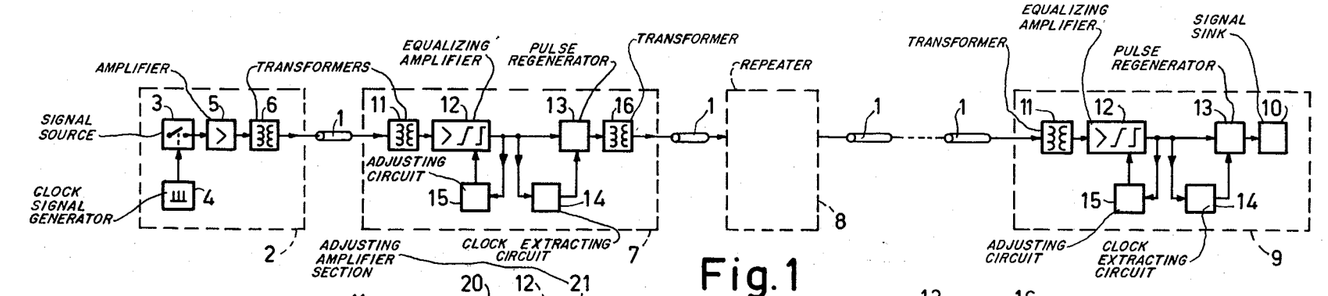
FIG. 1 shows schematically an embodiment of a known transmission system.

Referring now to FIG. 1, there is shown an embodiment of a transmission system for the transmission of pulse signals of fixed clock frequency, for example PCL signals having polar pulses and a clock frequency of 560 MHz, via a transmission path in the form of a coaxial cable 1. The pulse signals are produced by a transmitter 2 in which a signal source 3 delivers pulses only at instants determined by a clock frequency of a clock signal generator 4. After amplification in an amplifier 5 the pulse signals are applied via an output circuit 6 including a transformer to the transmission path and transmitted via repeater 7, 8, . . . inserted into the cable 1 at regular intervals to a receiver 9 including a signal sink 10.

The repeaters 7, 8, . . . and the receiver 9 each have an input circuit 11 including a transformer to which an equalizing amplifier 12 is connected for equalizing the amplitude and phase characteristics of the preceding cable section. To the output of the equalizing amplifier 12 are connected a pulse regenerator 13 for regenerating the received signal pulses as regards shape and instant of occurrence and a clock extraction circuit 14 for recovering the clock frequency for controlling the pulse regenerator 13. To the output of the equalizing amplifier 12 there is further connected an adjusting circuit 15 which generates an adjusting signal for automatically adapting the equalizing amplifier 12 if the transfer characteristic of the preceding cable section exhibits variations from its nominal form owing to deviations in section length and variations of the ambient temperature. In the repeaters 7, 8, . . . the regenerated pulse signals are applied via an output circuit 16 including a transformer to the next cable section.

Figure 2:
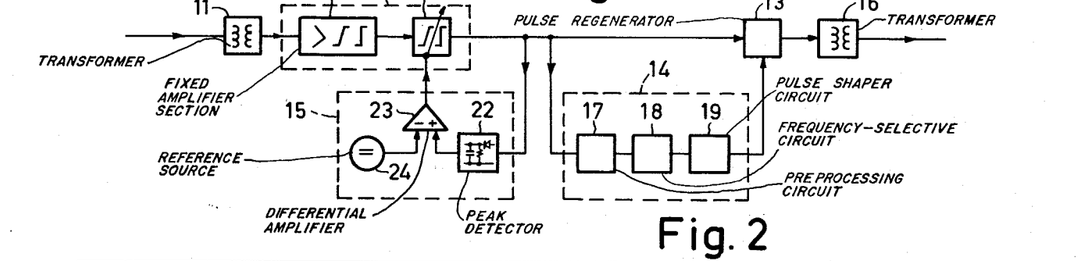
FIG. 2 shows the structure of a repeater in the transmission system of FIG. 1.

FIG. 2 shows in more detail the structure of the equal repeaters 7, 8, . . . of FIG. 1, corresponding elements in FIG. 1 and FIG. 2 being designated by like reference numerals.

Generally the bandwidth of the received pulse signals is limited to an extent such that they do not contain components at the clock frequency. In order to enable the clock frequency to be recovered from the received pulse signals in this case, the clock extraction circuit 14 includes a preprocessing circuit 17 in which the received pulse signals are subjected to non-linear processing to obtain a signal having a component at the clock frequency. This component is filtered out by means of a frequency-selective circuit 18 and is applied to a pulse shaper circuit 19 to obtain clock pulses having the shape and the phase required for pulse regeneration in the pulse regenerator 13. Various embodiments of such a clock extraction circuit are known which, however, are not of importance for the present specification and hence are not shown in detail.

The equalizing amplifier 12 has a fixed section 20 in which the amplification proper of the received pulse signals and equalization of the preceding cable section at nominal section length and at nominal cable temperature are effected. For the pulse regeneration this fixed section 20 usually is adjusted so that the overall transfer characteristic of the nominal cable section and the fixed section 20 of the equalizing amplifier 12 approximately satisfies the first Nyquist criterion (no intersymbol interference at the nominal regeneration instants). The equalizing amplifier 12 further includes an adjustable section 21 for equalizing variations with respect to the nominal transfer characteristic which are caused by the cable temperature which varies with time and the deviations from the nominal section length which are inevitable in practice. While differing section lengths are used this subdivision avoids the use of a large number of differently implemented equalizing amplifiers 12 each of which, in addition, must be adjustable in view of temperature variations.

The fixed section 20 of the equalizing amplifier 12 can be implemented in a variety of known manners. A possible embodiment is an operational amplifier the negative-feedback loop of which includes an equalizing network. Another possibility is a cascade arrangement of a plurality of constant-resistance equalizing networks, for example bridged T-networks, preceded or succeeded by a wideband amplifier for the pulse signals. An embodiment which preferably is used when high gain factors are to be realized comprises a distributed equalizing amplifier in which both gain and equalization are distributed over a number of cascade-connected stages, each comprising an amplifier having an equalizing network included in its negative-feedback loop. This distribution inter alia has the advantage that the negative feedback is simpler and particularly at high frequencies more stable than in a multistage amplifier using a single negative-feedback loop for the entire amplifier.

Figure 3:
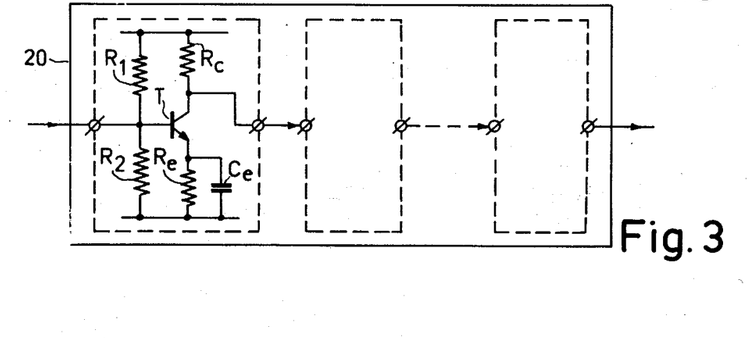
FIGS. 3 and 4 show possible embodiments of the fixed and adjustable sections respectively of the equalizing amplifier used in the repeater of FIG. 2.

In the repeater of FIG. 2 such a distributed equalizing amplifier is used for the fixed section 20, because with pulse signals at a clock frequency of 560 MHz in the case of the usual 2.6/9.5 mm coaxial cables having a nominal section length of 1.3 km a gain of 60 dB must be achieved over a frequency band of 0 to 420 MHz. FIG. 3 shows an embodiment of the fixed section 20 which is used in FIG. 2 and comprises a cascade of identically structured first-order amplifier stages. As FIG. 3 shows for the first amplifier stage, each stage comprises a transistor T in common-emitter configuration, two resistors $R_1$ and $R_2$ being connected to the base for current biassing. The collector circuit includes a resistor $R_c$, and the emitter circuit includes a parallel combination of a resistor $R_e$ and a capacitor $C_e$. The amplifier stages are of identical design except for the capacitors $C_e$ the values of which for the purpose of equalization are chosen so that going from the input of the cascade the corner frequency of a given stage always lies at a higher frequency than the corner frequency of the next stage.

Figure 4:
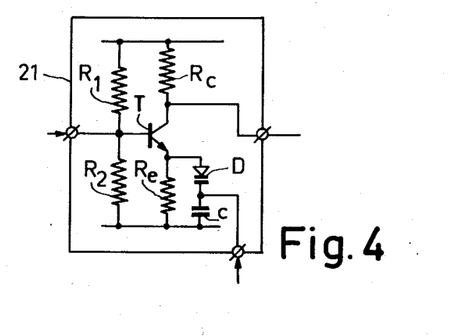

The adjustable section 21 of the equalizing amplifier 12 contains at least one equalizing network having a transfer characteristic with a real pole and designed so that the location of this pole can be changed by means of an adjusting signal. This adjustable section 21 can be connected to the output of the fixed section 20 (as in the case in FIG. 2), however, it may alternatively be connected to the input thereof. This adjustable section 21 can be implemented in a variety of known manners, however, when using a fixed section 20 as shown in FIG. 3 the design shown in FIG. 4 is to be preferred. As FIG. 4 shows, the structure of the adjustable section differs from that of a stage in the fixed section of FIG. 3 only in that the series combination of a variable impedance in the form of a diode D of variable capacitance and a capacitor C is connected in parallel with the resistor $R_e$. By means of an adjusting voltage the capacitance value of the diode D and hence the location of the pole of the adjustable section can be varied. The capacitor $c$ is a blocking capacitor for this adjusting voltage.

As mentioned hereinbefore, in the known transmission system of FIG. 1 the adjusting signal is obtained by means of an adjusting circuit 15 connected to the output of the equalizing amplifier 12. This adjusting circuit 15 is shown in more detail in FIG. 2 and comprises a peak detector 22 for generating a direct voltage which is proportional to the peak value of the pulse signals at the output of the equalizing amplifier 12, and a differential amplifier 23 to which are connected the peak detector 22 and a reference source 24 for obtaining an adjusting voltage which is applied to the adjustable section 21 to adjust the capacitance value of the diode D (cf. FIG. 4). This control ensures that the pulse signals at the output of the equalizing amplifier 12 have a constant peak value which is determined by the reference source 24 in the adjusting circuit 15. Thus automatic equalization of the deviations from the nominal transfer characteristic of the preceding cable section is achieved, because it can be shown that the peak value of the equalized signals is a suitable measure of the losses in this cable section.

Adjustment of the equalizing amplifier 12, however, involves requirements of accuracy and stability of the fixed section 20 in view of pulse regeneration that are appreciably more stringent in order to obtain a reliable adjusting signal, for a variation in this fixed section 20 gives rise to a false variation in the adjusting signal and hence results in incorrect adjustment of the equalization. To enable a reliable adjusting signal to be obtained in this case also, the accuracy and the stability of the fixed section 20 are required to be at least one order of magnitude better than the probable deviations from the nominal transfer characteristic of the cable section owing to deviation section lengths and temperature variations. This requirement renders the design of the fixed section 20 of the equalizing amplifier 12, which in any case is complicated at the high clock frequency, considerably more difficult. In addition, even then correct adjustment of the equalization is not obtained under all conditions, because the adjusting signal is dependent upon the variations in the pattern of the transmitted pulse signals. If, for example, with an initially correct adjustment, during a comparatively long period of time the number of "0" pulses is greater than that of "1" pulses, the output voltage of the peak detector 22 slightly decrease so that the adjusting voltage and hence the adjustment of the equalization change without reason. Special measures have to be taken to prevent this undesirable effect.

Figure 5:
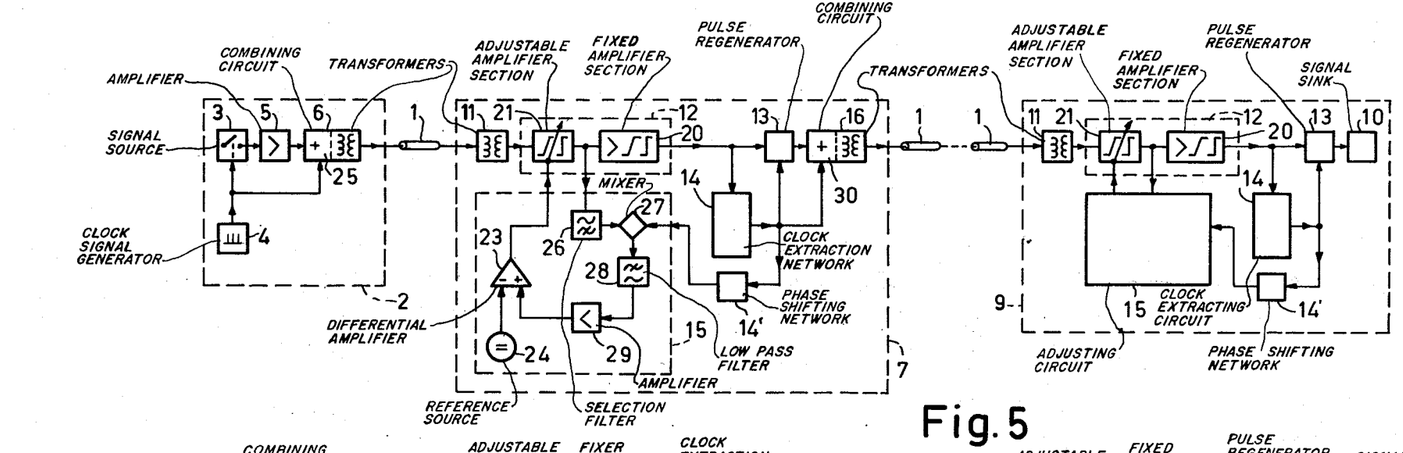
FIG. 5 shows schematically a transmission system according to the invention.

In contrast therewith, in the transmission system according to the invention shown in FIG. 5 a correct adjustment of the equalization is ensured under all conditions without the necessity for the fixed section 20 of the equalizing amplifier 12 to satisfy additional requirements in order to obtain a reliable adjusting signal. Elements in FIG. 5 which correspond to elements in preceding Figures are designated by the same reference numerals.

According to the invention, in the transmission system of FIG. 5 there is included in the transmitter 2 a combining circuit 25 in which the pulse signals from the signal source 3 are combined with a pilot signal which is synchronized with the clock frequency of the clock signal generator 4. As is shown in FIG. 5 with respect to the first repeater 7, each of the equal adjusting circuits 15 of the receiver 9 and of the repeaters 7, 8, . . . is provided with a selection filter 26 coupled to the input circuit and serving to select the received pilot signal, which in a mixer stage 27 is mixed with a local pilot signal derived from the clock extraction circuit. The mixing product is selected by means of a lowpass filter 28 and is applied via an amplifier 29 as an adjusting signal to the adjustable section 21 of the equalizing amplifier 12. Furthermore there is inserted into the output circuit 16 of each repeater 7, 8, . . . a combining circuit 30 in which the pulse signals regenerated in the pulse regenerator 13 are combined with the local pilot signal.

In the embodiment of FIG. 5 the pilot signal in the transmitter 2 is constituted by the clock signal of the clock signal generator 4 while the local pilot signal in the receiver 9 and the repeaters 7, 8, . . . is constituted by the clock signal from the clock extraction circuit 14 applied to the pulse regenerator 13. In this case the frequency of the pilot signal lies comparatively far above the frequency band required for the transmission of the pulse signals, and if the signal pulses have a duration equal to the clock period, this frequency even lies at a spectral zero of the pulse signals so that there is substantially no mutual influence and the received pilot signal can simply be selected by means of a selection filter 26 in the form of a highpass filter.

The system of FIG. 5 further uses an adjustable section 21 of the structure shown in FIG. 4. Because the capacitance value of the diode D used in this section is a non-linear function of the adjusting voltage, the received pilot signal is derived from the output of the adjustable section 21, while in the adjusting circuit 15 the output of the amplifier 29 here also is connected to the differential amplifier 23, as is the reference source 24. In this embodiment the diode D forms part of a control loop so that the non-linear dependence of its capacitance value does not prevent correct adjustment.

In order not to increase the stringency of the requirements to be satisfied by the fixed section 20 in FIG. 5, the adjustable section 21 precedes the fixed section 20, as will be explained more fully hereinafter.

In the transmission system under consideration the received pilot signal may alternatively be directly derived from the input circuit 11, if the amplifier 29 can be given a non-linear gain characteristic such that its output voltage always is exactly equal to that adjustment voltage which, with the instantaneous received pilot signal, is required for correct adjustment of the equalization. In such case the differential amplifier 23 and the reference source 24 may be dispensed with, and the location of the adjustable section 21 relative to the fixed section 20 then is of minor importance. The embodiment shown in FIG. 5 in which the amplifier 29 has a linear gain characteristic, however, is to be preferred for practical reasons.

The use of the steps according to the invention simply provides a highly reliable adjusting signal for equalization in the transmission system of FIG. 5, for the amplitude of the received pilot signal is an exact measure of the losses which occur in the preceding cable section, because the pilot signal is applied to this cable signal with a known constant amplitude and the transmission of this pilot signal is not influenced by the pulse signals. In addition, in the system of FIG. 5 the pilot signal has a frequency located far above the frequency band required for pulse signal transmission, resulting in high sensitivity, because the cable losses and hence the variations in the cable losses increase exponentially with the square root of the frequency.

In each adjusting circuit 15 the adjusting signal is accurately and stably derived from the received pilot signal. The pilot signal, which is separated by means of the highpass filter 26, is mixed in the mixer stage 27 with a local pilot signal of equal frequency which is derived from the clock extraction circuit 14 via a phase-shifting network 14'. The mixing operation has a synchronous nature, for the pilot signal applied to a cable section is constituted by the clock signal of the pulse signals to be transmitted via this cable section, and the local pilot signal is constituted by the local clock signal which is derived from the transmitted pulse signals and always is in synchronism with the clock signal supplied to the cable section. Because the local clock signal has a constant amplitude, the amplitude of the mixing product, which is selected by means of the lowpass filter 28, also is an exact measure of the cable losses, and thus the output signal from the differential amplifier 23 is a reliable adjusting signal for automatic equalization of variations in the transfer characteristic of the preceding cable section which are due to variations in the said cable losses.

By thus using a pilot signal which is not disturbed by the pulse signals and by synchronously mixing this pilot signal with the available local clock signal a mixing product is obtained which can be amplified highly selectively. Consequently, a high gain in the signal-to-noise ratio of the adjustment signal is obtained which amply makes up for the large cable losses at the high frequency of the pilot signal. Furthermore the accuracy and stability required for correct adjustment of equalization now need not be achieved at the high frequency of the pilot signal, but owing to the synchronous mixing operation at the comparatively low frequency of the mixing product, enabling this accuracy and stability to be realized by much simpler means.

In the described simple manner correct adjustment of equalization is ensured in all conditions while moreover the important practical advantage is achieved that for this purpose the accuracy and stability of the fixed section 20 of the equalizing amplifier 12 need not satisfy additional requirements. With respect to the gain of 60 dB over a frequency band of 0 – 420 MHz the design and implementation of the fixed section will consequently be much simpler than in the known transmission system of FIG. 1, because the requirements as regards accuracy and stability are solely determined by the pulse regenerator 13.

To give an impression of this important advantage the general design of the fixed section 20 of the equalizing amplifier 12 will be considered in more detail for each of the two transmission systems, equalization being left out of consideration for the sake of simplicity. In both cases a gain G must be achieved over a frequency band B ($-3$ dB) by means of a cascade arrangement of $n$ identical transistor amplifier stages each having a gain $g$ and a bandwidth $b$ ($-3$dB). For simplicity, the amplifier stages are assigned a first-order transfer function. Corresponding considerations can be made for amplifier stages having higher-order transfer functions.

In a first approximation, for an amplifier stage of the type shown in FIG. 3 the gain-bandwidth product is constant and equal to the current gain-bandwidth product $f_T$ of the transistor I at the bias current selected:

$$gb = f_T \quad (1)$$

For the gain per stage we have:

$$g = i/(1+ak) \quad (2)$$

where $a$ is the gain without negative feedback (the open-loop gain) and $k$ is the negative-feedback factor. For the cascade arrangement of $n$ stages we have the following relationships:

$$G = g^n \quad (3)$$

$$B = b \sqrt{2^{1/n}-1} \quad (4)$$

Furthermore the relative variation $dG/G$ for the cascade resulting from the relative variation $da/a$ for the stages has to satisfy a given requirement which is expressed in the value of the ratio:

$$S = (dG/G)/(da/a) \quad (5)$$

for which it follows from formulae (2) and (3):

$$S = n/1(1+ak)2 \quad (6)$$

Among the many possible solutions there is only one which gives minimum dissipation, i.e. the solution in which the product $na$ has the lowest value, because the smallest amount of dissipation per stage will occur at the lowest value of $a$. From formula (6) it then follows that at a given value of S minimization of dissipation is generally accompanied by minimization of the number of stages, at least when $ak \gg 1$. A minimum value of $n$ can be determined by means of the relationship $$BG^{1/n} = f_T \sqrt{2^{1/n}-1} \quad (7)$$

which can be derived from formulae (1), (3) and (4). Substitution of this value $n$ in formula (3) and formula (6) then gives the values of $g$ and $ak$ respectively, from which the values of $a$ and $k$ can be found by means of formula (2).

Both in FIG. 1 and in FIG. 5 the fixed section 20 must have a gain which is sufficient to compensate for the cable losses which occur with a nominal section length $l$. These cable losses are given by $\exp(Al\sqrt{f})$, where $f$ is the frequency and A is a constant (which still does depend upon the cable temperature), and typically are 60 dB at one half of the clock frequency, so that G is assumed to be 60 dB. Owing to practical problems which arise in placing the repeaters 7, 8, ... a tolerance of ± 10% in the nominal section length and hence a spread of ± 6 dB in the cable losses must be allowed for which have to be equalized by the adjustable section 21.

In order to obtain a reliable adjusting signal for equalization in the known transmission system of FIG. 1, the accuracy of the gain, as has been explained hereinbefore, must be better by an order of magnitude than the spread in the cable losses, so that in the system of FIG. 1 $dG/G$ must be assumed to be ± 0.6 dB. By the use of the steps described such limitation is not required in the transmission system of FIG. 5, but here the accuracy of the gain depends solely upon the requirements imposed by the pulse regeneration. If in FIG. 5 no automatic gain control is used, a spread of ± 6 dB is surely permitted, so that $dG/G$ now can be assumed to be ± 6 dB.

In view of tolerances and temperature influences it is sufficient in practice to allow for a spread of ± 20% in the open-loop gain of the stages, so that in both cases $da/a$ is assumed to be ± 1.6 dB.

When a transistor having a $f_T = 3.5$ GHz is used with normal bias current, the results of the computations for the aforementioned data are given in the following Table.

|       | FIG. 1 | FIG. 5 |
| ----- | ------ | ------ |
| S     | 0.36   | 5      |
| n     | 7      | 7      |
| g     | 2.68   | 2.68   |
| 1 + a.k | 19.5 | 1.4    |
| a     | 52.3   | 3.75   |
| k     | 0.354  | 0.107  |
| n.a   | 366    | 26     |

The Table clearly shows that the design of the fixed section in the transmission system of FIG. 5 is far more attractive for practical implementation than that in the known transmission system of FIG. 1. Not only is the dissipation for FIG. 5 lower by a factor of 14 than for FIG. 1, but also the biassing of the transistor T in the amplifier stages is much more satisfactory for FIG. 5 than for FIG. 1. In practice the value of the collector resistor $R_c$ is more or less fixed (inter alia) to prevent the collector-emitter capacitance together with the collector resistor $R_c$ from giving rise to a second-order corner frequency within the band) so that the open-loop gain in FIG. 1, which is much higher than in FIG. 5, is accompanied with far higher bias currents for the transistor T and, as is known, this results in a decrease of the current gain-bandwidth product $f_T$. If with this value of $a$ the value of $f_T$ drops, for example, to 3.2 GHz, with the same value of $g$ there follows from formulae (1) and (4) a value B of 384 MHz, that is to say lower than the desired value of 420 MHz. In order to obtain the desired values of G, B and S in FIG. 1 new computations have to be performed for $f_T = 3.2$ GHz, resulting in: $n = 9$; $g = 2.15$; $(1 + ak) = 25$; $a = 53.8$; $k = 0.465$; $na = 484$. Hence 2 additional amplifier stages are required and dissipation is higher than for the system of FIG. 5 by a factor of 18.5

Thus the use of the steps according to the invention in the transmission system of FIG. 5 ensures that the equalization will be correctly adjusted under all conditions without the accuracy and stability of the fixed section 20 of the equalizing amplifier 12 having to satisfy additional requirements, and at the same time a simiplicity in structure and implementation is obtained which is attractive for practical realization and renders the transmission system highly suited for pulse signals having very high clock frequencies. It should be mentioned that in FIG. 5 no steps need be taken to reduce the influence of the pilot signal on the regeneration of the pulse signals, because at the frequency of this pilot signal the cable losses are high in any case and moreover this frequency lies far above the pass band of the equalizing amplifier 12.

Figure 6:
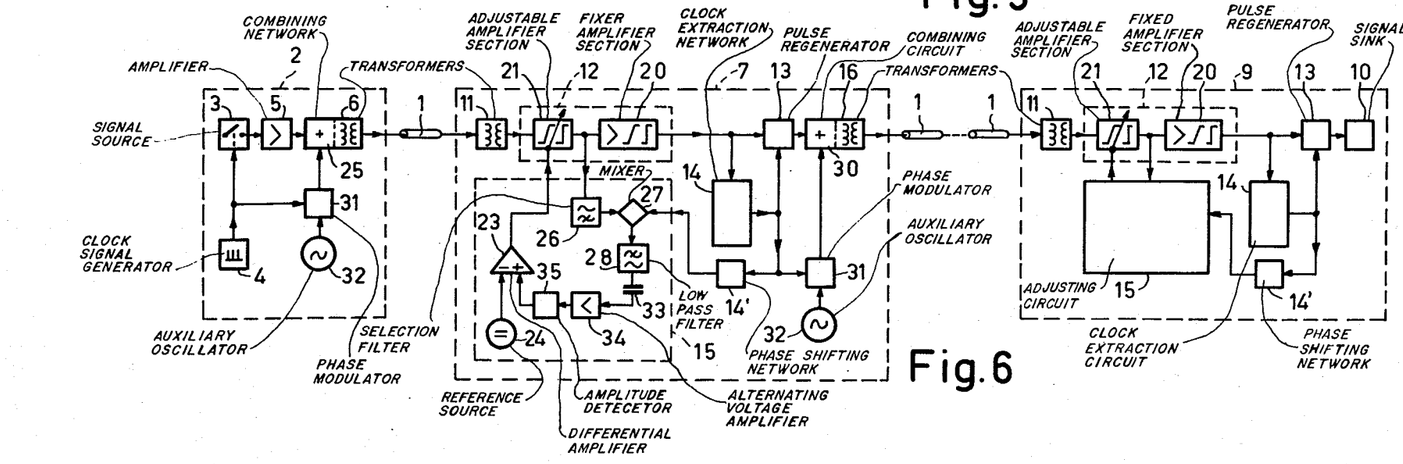
FIG. 6 shows schematically a modified embodiment of the transmission system of FIG. 5.

FIG. 6 shows a modified embodiment of the transmission system of FIG. 5, corresponding elements being designated by like reference numerals. The transmission system of FIG. 6 differs from that of FIG. 5 in that in the transmitter 2 and the repeaters 7, 8, . . . the clock signals from the clock generator 4 and the clock extraction circuit 14 are not directly applied as pilot signals to the next cable section but first are phase-modulated in a phase-modulator 31 by an auxiliary signal of constant amplitude and comparatively low frequency supplied by an auxiliary oscillator 32. The amplitude of this auxiliary signal is chosen to be so much smaller than that of the clock signal that a narrow-band phase-modulated pilot signal is produced in which apart from the carrier at clock frequency only two first-order sidebands are present. The frequency of this auxiliary signal may, for example, be only 10 kHz. In the adjusting circuit 15 the phase-modulated pilot signal is mixed in the mixer stage 27 with a local clock signal the phase of which has been adjusted in the phase-shifting network 14' so that at the output of the mixer stage 27 a mixing product is produced at the frequency of the auxiliary signal. The amplitude of this mixing product also is an exact measure of the losses in the preceding cable section, and in FIG. 6 this amplitude is used to obtain the adjusting signal for equalization. For this purpose in FIG. 6 the output of the lowpass filter 28 is connected, via a capacitor 33 for blocking any direct-voltage terms, to an alternating-voltage amplifier 34 which amplifies the mixing product at the frequency of the auxiliary signal. By means of an amplitude detector 35 the amplitude of the amplified mixing product then is determined and applied to the differential amplifier 23. Thus the gain required in the adjusting circuit 15 need not be realized for a direct-voltage signal, as is the case in FIG. 5, but owing to the phase modulation of the pilot signal need only be realized for an alternating-voltage signal at the frequency of the auxiliary signal. The fact that in FIG. 6 an alternating-voltage amplifier 34 can be used instead of the direct-voltage amplifier 29 of FIG. 5 is an important practical advantage, because, as is known, the required accuracy and stability can be achieved much simpler in an alternating-voltage amplifier than in a direct-voltage amplifier.

Figure 7:
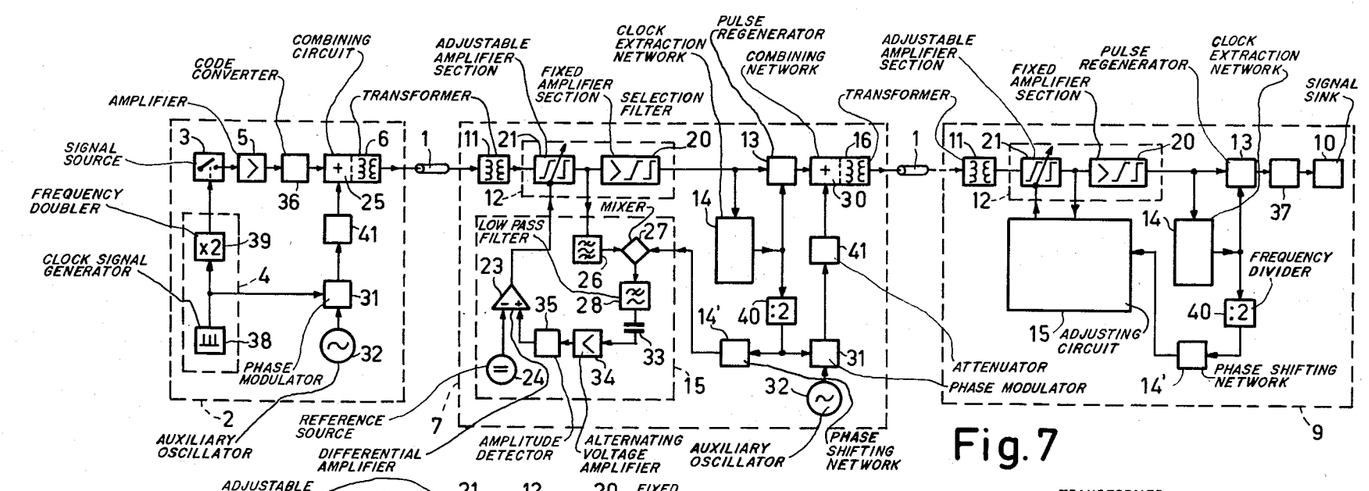
FIG. 7 shows schematically a modified embodiment of the transmission system of FIG. 6.

In the embodiments of FIGS. 5 and 6 the pilot signal has the same frequency as the clock signal of the pulse signals. If, however, these pulse signals are coded so that their frequency spectrum has spectral zeros at integral submultiples of the clock frequency, the frequency of the pilot signal may also be equal to such a submultiple of the clock frequency, because in this case also the signals substantially do not affect the transmission of the pilot signal. FIG. 7 shows a modified embodiment of the transmission system of FIG. 6 in which such coding is used. Corresponding elements are designated in FIGS. 6 and 7 by like reference numerals.

In the transmitter 2 of FIG. 7 the pulse signals from the pulse source 3 are so coded in a code-converter 36 that their frequency spectrum has a spectral zero at one half of the clock frequency, the frequency of the pilot signal also being selected to be equal to one half of the clock frequency. In the receiver 9 the original pulse signals from the signal source 3 are recovered by means of an inverse code converter 37. Such code converters are generally known and hence need not be described more fully.

To ensure that the pilot signal is synchronized with the clock signal, in FIG. 7 the clock signal generator 4 in the transmitter 2 is constituted by a generator 38 at one half of the clock frequency from which the pilot signal is directly derived whilst the clock signal is derived via a frequency doubler 39. Similarly in repeaters 7, 8, . . . and in receiver 9 the local pilot signal is derived from the local clock signal of the clock extraction circuit 14 via a frequency divider 40 having a divisor 2. Because the frequency of the pilot signal now lies within the passband of the equalizing amplifiers 12 in the repeaters 7, 8, . . . and of the transmitter 9, in FIG. 7 the level of this pilot signal is reduced by means of an attenuator 41 to a degree such that this level is about 25 dB than that of the pulse signals applied to the combining circuits 25 and 30 of the transmitter 2 and each of the repeaters 7, 8, . . . respectively. Thus a possible disturbing influence of the pilot signal on the regeneration of the pulse signals is prevented. Furthermore the selection filter 26 in the adjusting circuit 15 now is constituted by a bandpass filter tuned to one half of the clock frequency. The selectivity of this bandpass filter 26 need not satisfy particular requirements, because owing to the synchronous mixing operation the selection proper is performed only after the mixer stage 27.

With rsepect to automatic equalization of the transfer characteristic of the preceding cable section there is no difference in operation between the transmission systems of FIG. 6 and FIG. 7, so that all the advantages which arise from the use of the steps according to the invention are obtained in FIG. 7 also.

In the embodiments hitherto described the relationship between the pilot signal and the clock signal is used to derive in a simple manner a highly reliable adjusting signal for automatic equalization from the amplitude of the received pilot signal. However, the use of the steps described provides the addition possibility of using this relationship also for recovering the clock frequency for controlling the pulse regenerators.

Figure 8:
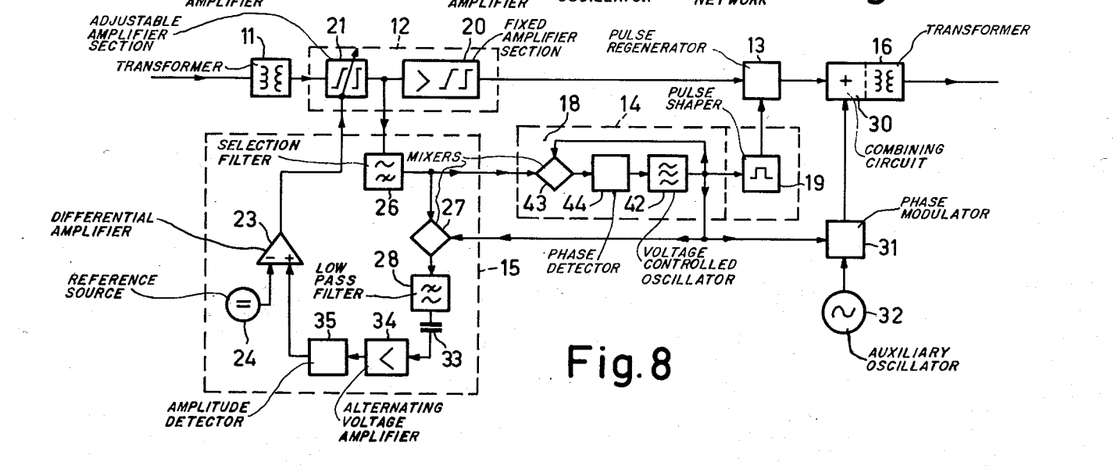
FIG. 8 shows schematically a modified embodiment of the repeater used in the system of FIG. 6.

By way of example FIG. 8 shows an embodiment of a repeater for the transmission system of FIG. 6 in which the local clock signal is not derived from the received pulse signals but from the received pilot signal. Elements of FIG. 8 which correspond to elements in preceding Figures are designated by like reference numerals.

In FIG. 8 the pilot signal selected by means of the selection filter 26 is applied not only to the mixer stage 27 but also to the clock extraction circuit 14. In the latter circuit the pilot signal is directly applied to the frequency selective circuit 18 which is in the form of a phase-locked loop having a first-order loop filter and a comparatively high loop gain. This loop comprises a voltage-controlled oscillator 42 the natural frequency of which is substantially equal to the clock frequency and the output of which is connected to the pulse shaper circuit 19 and to a first input of a phase detector 43. The selection filter 26 is connected to the second input of the phase detector 43 the output voltage of which is applied via a loop filter 44 has a frequency control voltage to the oscillator 42. The local clock signal for the mixer stage 27 and for the phase modulator 31 is derived from the output of the oscillator 42.

The phase modulation of the pilot signal by the auxiliary signal from the auxiliary oscillator 32 in FIG. 8 will not interfere with the recovery of the clock frequency, if the frequency of this auxiliary signal is selected so that the two first-order side-bands of the phase-modulated pilot signal fall outside the passband of the frequency-selective circuit 18 so that only the carrier of clock frequency is used for generating the local clock signal.

Thus the relationship between the pilot signal and the clock signal can also be used for recovering the local clock signal, which provides the advantage that in the clock extraction circuit 14 the preprocessing circuit 17, which in the circuit of FIG. 2 was required to derive a signal containing a component at the clock frequency from the received pulse signals by means of a non-linear signal processing operation, can now be dispensed with.

It should be mentioned that in the embodiments of FIG. 6, FIG. 7 and FIG. 8 the modulator 31 can also be realized as an amplitude modulator. In this case also a modulated pilot signal is produced in the form of a carrier synchronized with the clock signal and two first-order side-bands which after synchronous mixing in mixer stage 27 produce a mixing product at the frequency of the auxiliary signal the amplitude of which can be used for obtaining the adjusting signal. In such an arrangement the setting of the phase-shifting network 14' in FIGS. 6 and 7 differs 90° from that when using a phase modulator, while in FIG. 8 a 90° phase-shifting network is inserted into the connection between the oscillator 42 and the mixer stage 27. The choice of the modulation method used depends upon the simplicity of practical implementation. In view of the high frequencies of the pilot signal, in practice phase modulation will be preferred.

What is claimed is:

1. Transmission system for pulse signals of fixed clock frequency comprising a transmitter, a receiver and a plurality of repeaters located in a transmission path, the receiver and the repeaters each being provided with an input circuit and with an equalizing amplifier which is connected thereto and comprises a fixed section for equalizing the nominal transfer characteristic of the preceding transmission path and an adjustable section with associated adjusting circuit for automatically equalizing deviations from the said nominal transfer characteristic, the equalizing amplifier being connected to a pulse regenerator and to a clock extraction circuit for obtaining the clock frequency for controlling the pulse regenerator, an output circuit being connected to the pulse regenerator, characterized in that the transmitter includes a combining circuit in which the pulse signals are combined with a pilot signal synchronized with the clock frequency, and the adjusting circuit in the receiver and in each repeater is provided with a selection filter coupled to the input circuit and serving to select the received pilot signal, which in a mixer stage is mixed with a local pilot signal derived from the clock extraction circuit, the mixing product, selected by means of a lowpass filter being applied via an amplifier as an adjusting signal to the adjustable section of the equalizing amplifier, the output circuit of each repeater including a combining circuit in which the pulse signals regenerated in the pulse regenerator are combined with the local pilot signal.

2. Transmission system as claimed in claim 1, characterized in that the transmitter and each repeater includes a modulator in which a signal synchronized with the clock frequency is modulated by a constant-amplitude auxiliary signal derived from an oscillator and having a frequency much lower than the clock frequency so as to obtain a narrow-band modulated signal which apart from a carrier comprises only two first-order sidebands and in the combining circuits is combined as a pilot signal with the pulse signals, and in that furthermore in the adjusting circuit of the receiver and each repeater the received modulated pilot signal is mixed with a local carrier of a phase such that at the frequency of the auxiliary signal a mixing product is produced from which the adjusting signal is obtained by means of an alternating-voltage amplifier and an amplitude detector.

3. Transmission system as claimed in claim 1, characterized in that the frequency of the pilot signal in the transmitter and of the local pilot signal in the receiver and in each repeater is equal to the clock frequency of the pulse signals.

4. Transmission system as claimed in claim 1, in which the frequency spectrum of the pulse signals exhibits spectral zeros at integral submultiples of the clock frequency, characterized in that the frequency of the pilot signal in the transmitter and of the local pilot signal in the receiver and in each repeater is equal to an integral submultiple of the clock frequency.

5. Transmission system as claimed in claim 1, characterized in that in the receiver and in each repeater the selection filter for the pilot signal is also connected to the clock extraction circuit for recovering the clock frequency for controlling the pulse regenerator from the received pilot signal.

* * * * *

UNITED STATES PATENT AND TRADEMARK OFFICE
CERTIFICATE OF CORRECTION

PATENT NO. : 3,993,952
DATED : November 23, 1976
INVENTOR(S) : ENGEL ROZA

It is certified that error appears in the above–identified patent and that said Letters Patent are hereby corrected as shown below:

IN THE SPECIFICATION

Col. 5, line 11, "decrease" should be --decreases--;

Col. 7, line 29, "I" should be --T--;

line 35, equation (2) should read --g = a/(1+ak)--;

Col. 10, line 45, "rsepect" should be --respect--;

Signed and Sealed this twelfth Day of July 1977

[SEAL]

Attest:

RUTH C. MASON
*Attesting Officer*

C. MARSHALL DANN
*Commissioner of Patents and Trademarks*